(12) United States Patent
Trivette et al.

(10) Patent No.: US 6,545,234 B1
(45) Date of Patent: Apr. 8, 2003

(54) CIRCUIT BREAKER WITH MECHANICAL INTERLOCK

(75) Inventors: Marty L. Trivette, Cary, NC (US); Murray K. Jones, Johnsonville, SC (US)

(73) Assignee: ABB Technology, Zurich (CH)

( * ) Notice: Subject to any disclaimer, the term of this patent is extended or adjusted under 35 U.S.C. 154(b) by 0 days.

(21) Appl. No.: 10/023,568

(22) Filed: Dec. 18, 2001

(51) Int. Cl.[7] ................................................. H01H 9/20
(52) U.S. Cl. .................................. 200/50.21; 200/50.24
(58) Field of Search .......................... 200/50.21–50.27; 218/120, 140, 153–155, 78, 84

(56) References Cited

U.S. PATENT DOCUMENTS

| | | | | |
|---|---|---|---|---|
| 3,567,886 A | * | 3/1971 | Ross | 200/401 |
| 3,772,489 A | * | 11/1973 | Wilson | 200/50.23 |
| 3,958,156 A | * | 5/1976 | Tjebben | 361/606 |
| 4,713,501 A | * | 12/1987 | Herrmann | 200/50.22 |
| 4,879,535 A | | 11/1989 | Mori et al. | 335/14 |
| 5,381,121 A | | 1/1995 | Peter et al. | 335/20 |
| 5,831,503 A | | 11/1998 | Beck et al. | 335/172 |
| 5,861,784 A | | 1/1999 | Heise et al. | 335/20 |
| 5,875,088 A | | 2/1999 | Matsko et al. | 361/96 |
| 5,936,817 A | | 8/1999 | Matsko et al. | 361/72 |
| 6,028,272 A | | 2/2000 | Akers | 200/50.26 |
| 6,140,897 A | | 10/2000 | Mueller et al. | 335/172 |
| 6,194,983 B1 | | 2/2001 | Bogdon et al. | 335/68 |

* cited by examiner

*Primary Examiner*—Elvin Enad
*Assistant Examiner*—Lisan Klaus
(74) *Attorney, Agent, or Firm*—Woodcock Washburn LLP (57) ABSTRACT

A presently-preferred embodiment of a circuit breaker comprises a contact mechanism adapted to be electrically coupled to an electrical circuit. The contact mechanism comprises a first contact member and a second contact member being movable in relation to the first contact member. The circuit breaker also comprises an actuator mechanism comprising an armature mechanically coupled to the second contact member. The armature is selectively positionable between a closed position in which the armature urges the second contact member into electrical contact with the first contact member thereby permitting energization of the electrical circuit, and an open position in which the armature urges the second contact member away from the first contact member thereby inhibiting energization of the electrical circuit.

34 Claims, 8 Drawing Sheets

CIRCUIT BREAKER WITH MECHANICAL INTERLOCK

FIELD OF THE INVENTION

The present invention related to circuit breakers for use in electrical circuits. More particularly, the invention relates to circuit breakers having a mechanical interlock for preventing inadvertent or otherwise unintentional actuation of the circuit breaker.

BACKGROUND OF THE INVENTION

Safety interlocks are often required on circuit breakers used in medium and high-voltage electrical circuits. Safety interlocks prevent closure of the electrical contacts within the circuit breaker, thereby preventing inadvertent or otherwise unintentional energization of the electrical circuit to which the circuit breaker is coupled.

Magnetic or electrically-actuated circuit breakers commonly use electrical interlocks. Electrical interlocks typically incorporate a switch that selectively interrupts the "close" signal generated by the circuit breaker's control system, thereby preventing the control system from energizing the actuator that closes the electrical contacts of the circuit breaker.

Electrical interlocks, although proven suitable for their intended purpose in many applications, are generally considered less effective than mechanical interlocks. Mechanical interlocks use some type of mechanical means to block movement of one or more components of the circuit breaker in a manner that prevents the electrical contacts of the circuit breaker from closing. Mechanical interlocks are often preferred or required by regulatory authorities. For example, American National Standards Institute (ANSI) C37.20.2 recommends the use of mechanical interlocks in medium-voltage circuit breakers to prevent the contacts of such breakers from closing unless the breaker is in full contact with a suitable connecting device, or is separated from the connecting device by a safe distance.

Mechanical interlocks, as noted above, rely on some type of physical means to block movement of the electrical contacts therein. Mechanical interlocks, therefore, are usually larger, more complex, and more expensive than an electrical interlock of comparable capability. In addition, the blocking contact between the mechanical interlock and the other components of a circuit breaker can lead to damage or premature wear of the contacting components.

SUMMARY OF THE INVENTION

A presently-preferred embodiment of a circuit breaker comprises a frame member, and a contact mechanism fixedly coupled to the frame member and being adapted to be electrically coupled to an electrical circuit. The contact mechanism comprises a first contact member and a second contact member being movable in relation to the first contact member. The circuit breaker also comprises an actuator mechanism fixedly coupled to the frame member. The actuator mechanism comprises an armature mechanically coupled to the second contact member. The armature is adapted to urge the second contact member into electrical contact with the first contact member on a selective basis.

The circuit breaker also comprises a racking mechanism comprising a channel member and a lead screw rotatably coupled to the channel member and the frame member. The frame member is movable between at least two predetermined positions in relation to the channel member in response to rotation of the lead screw. The circuit breaker further comprises a mechanical interlock coupled to the frame member and comprising a blocking pin positioned between the lead screw and the armature when the frame member is located between the at least two predetermined positions. The blocking pin is adapted to inhibit movement of the armature when the blocking pin is positioned between the lead screw and the armature, and thereby prevents the armature from urging the second contact member into electrical contact with the first contact member.

Another presently-preferred embodiment of a circuit breaker comprises a contact mechanism adapted to be electrically coupled to an electrical circuit. The contact mechanism comprises a first contact member and a second contact member being movable in relation to the first contact member. The circuit breaker also comprises an actuator mechanism comprising an armature mechanically coupled to the second contact member. The armature is selectively positionable between a closed position in which the armature urges the second contact member into electrical contact with the first contact member thereby permitting energization of the electrical circuit, and an open position in which the armature urges the second contact member away from the first contact member thereby inhibiting energization of the electrical circuit.

The circuit breaker further comprises a mechanical interlock comprising a blocking pin selectively positionable between a first position proximate the armature and a second position distal the armature. The blocking pin is adapted to interrupt movement of the armature from the open to the closed positions when the blocking pin is in the first position.

Another presently-preferred embodiment of a circuit breaker comprises a frame member movable between a connect position, a test position, and a disconnect position. The circuit breaker also comprises a contact mechanism fixedly coupled to the frame member and adapted to be electrically coupled to an electrical circuit. The contact mechanism comprises a first contact member and a second contact member movable in relation to the first contact member.

The circuit breaker further comprises an actuator mechanism fixedly coupled to the frame member. The actuator mechanism comprises an armature mechanically coupled to the second contact member and adapted to urge the second contact member into electrical contact with the first contact member on a selective basis. The circuit breaker also comprises a racking mechanism comprising a channel member and a lead screw rotatably coupled to the channel member and the frame member and having a first, a second, and a third through hole formed therein. The frame member is movable between the connect, test, and disconnect positions in response to rotation of the lead screw.

The circuit breaker further comprises a mechanical interlock coupled to the frame member. The mechanical interlock comprises a blocking pin and a pivot arm pivotally coupled to the blocking pin and adapted to move the blocking pin between a first position in which the blocking pin is located substantially within one of the first, second, and third through holes, and a second position. The blocking pin substantially aligns with the first, second, and third through holes when the frame member is located respectively in the connect, test, and disconnect positions. The blocking pin is adapted to interfere with movement of the armature when the blocking pin is located in the second position thereby preventing the armature from urging the second contact member into electrical contact with the first contact member.

BRIEF DESCRIPTION OF THE DRAWINGS

For the purpose of illustrating the invention, the drawings show an embodiment that is presently preferred. The invention is not limited, however, to the specific instrumentalities disclosed in the drawings. In the drawings.

DESCRIPTION OF PREFERRED EMBODIMENTS

FIGS. 1–7 depict a magnetically-actuated circuit breaker 10 incorporating a presently-preferred embodiment of a mechanical interlock 12. The figures are referenced to a common coordinate system 8 depicted therein. Details of the circuit breaker 10 are presented for exemplary purposes only; the mechanical interlock 12 can be used in conjunction with virtually any type of magnetically or electrically-actuated circuit breaker.

The circuit breaker 10 is adapted for use in switchgear of electrical power distribution systems. In particular, the circuit breaker 10 is adapted for installation in a switchgear enclosure (not shown). The circuit breaker 10 comprises a frame member 14 and a support truck 63 (see FIGS. 1 and 2). The frame member 14 is mounted on the support truck 63. The support truck 63 is adapted to be mounted on the switchgear enclosure, and is movable in relation to the switchgear enclosure on a plurality of wheels 17 (see FIG. 2).

The circuit breaker 10 also comprises an electronic control system 15 (see FIGS. 1, 4, 6, and 7). The electronic control system 15 comprises a microprocessor 15a, a memory-storage device 15b electrically coupled to the microprocessor 15a, and a set of computer-executable instructions 15c stored on the memory-storage device 15b.

Figure 3:
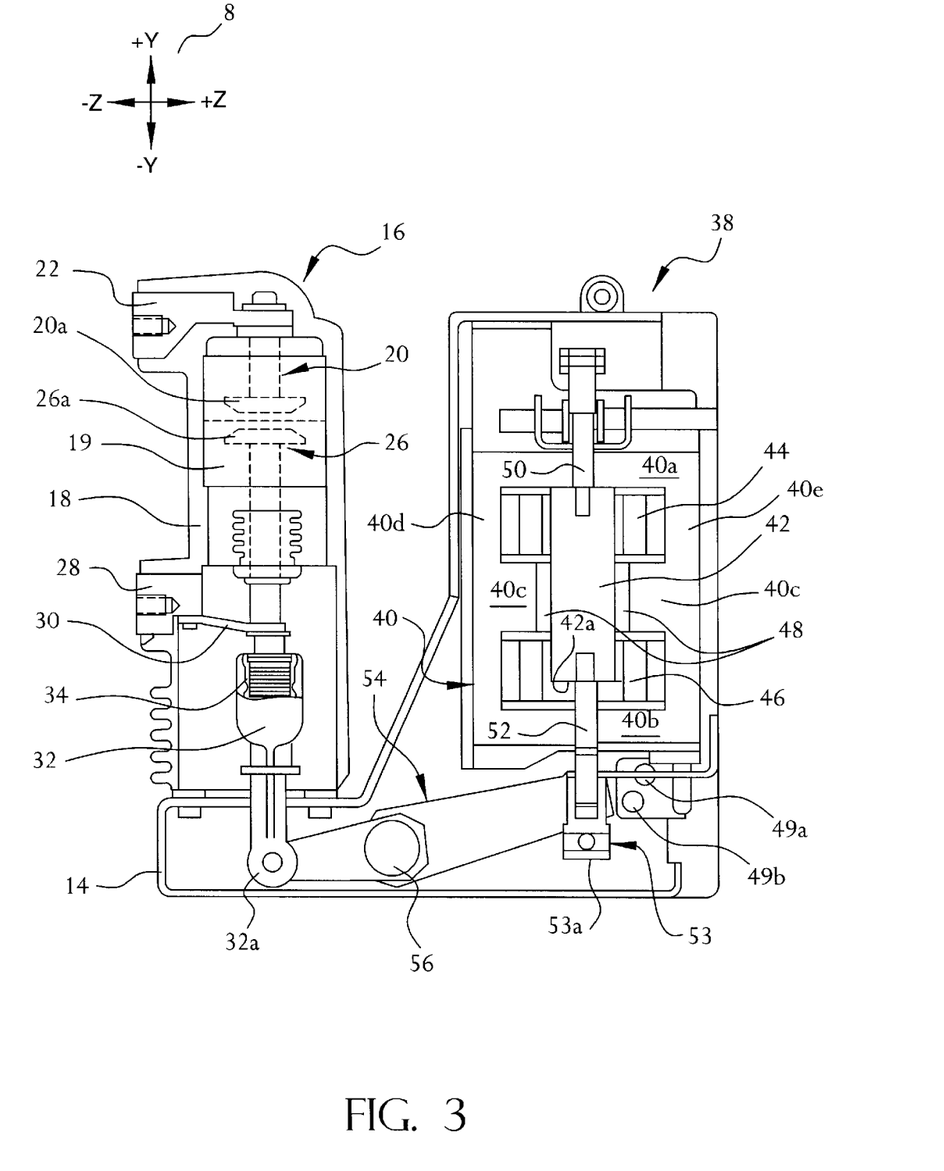
FIG. 3 is a cross-sectional view taken through the line "B—B" of FIG. 1.

The circuit breaker 10 further comprises a contact mechanism 16 (see FIG. 3). The contact mechanism 16 comprises a casing 18 fixedly coupled to the frame member 14. The contact mechanism 16 also comprises a vacuum interrupter 19, an electrically conductive upper contact 20, and an electrically-conductive lower contact 26 each disposed within the casing 18.

The upper contact 20 is fixedly coupled to the casing 18, and has an end portion 20a positioned within the vacuum interrupter 19. The lower contact 26, as explained in detail below, is adapted to translate vertically, i.e., in the "y" direction, between an "open" position and a "closed" position. The lower contact 26 contacts the upper contact 20 when the lower contact 26 is in the closed position, thereby facilitating the flow of electrical current through the contacts 20, 26. The lower contact 26 is spaced apart from the upper contact 20 when the lower contact 26 is in the closed position, thereby preventing the flow of electrical current through the contacts 20, 26.

(It should be noted that directional terms such as "upper," "lower," "downward," and "upward" are used in reference to the component orientations depicted in FIGS. 1–5; these terms are used for illustrative purposes only, and are not intended to limit the scope of the appended claims.)

The lower contact 26 is fixedly coupled to an insulated push rod 32, and has an end portion 26a positioned within the vacuum interrupter 19. A wipe spring 34 biases the lower contact 26 downward, i.e., in the "-y" direction.

The contact mechanism 16 also includes an upper primary terminal 22 and a lower primary terminal 28. The upper primary terminal 22 is fixedly coupled to an upper portion of the casing 18, and is electrically coupled to the upper contact 20. The lower primary terminal 28 is fixedly coupled to a lower portion of the casing 18, and is electrically coupled to the lower contact 26 via a flexible connector 30. The upper and lower primary terminals 22, 28 are adapted to be electrically coupled to a medium-voltage electrical circuit of an electrical power distribution system (hereinafter referred to as "the electrical circuit"). More particularly, the upper and lower primary terminals 22, 28 are each adapted to engage a respective stab (not shown) fixedly coupled to an inner surface of the switchgear enclosure in which the circuit breaker 10 is mounted. Contact between the primary terminals 22, 28 and the stabs establishes electrical contact between the circuit breaker 10 and the electrical circuit.

The circuit breaker 10 further comprises a magnetic actuator 38 (see FIG. 3). The magnetic actuator 38 comprises a core 40, an armature 42, an upper or "open" coil 44, a lower or "close" coil 46, and a permanent magnet 48. The core 40 is fixedly coupled to the frame member 14. The core 40 includes an upper leg 40a, a lower leg 40b, and two intermediate legs 40c that each extend substantially in the "z" direction denoted in the figures. The core 40 also includes a first yoke 40d and a second yoke 40e fixedly coupled to the upper, lower and intermediate legs 40a, 40b, 40c. The first and second yokes 40d, 40e each extend substantially in the "y" direction.

The armature 42 is disposed between the upper and lower legs 40a, 40b, and is adapted to translate vertically, i.e., in the "y" direction, between a lower or "closed" position and an upper or "open" position. The armature 42 is supported and guided by an upper pin 50 fixedly coupled to an upper portion of the armature 42 and extending through the upper leg 40a, and a lower pin 52 fixedly coupled to a lower portion of the armature 42 and extending through the lower leg 40b. An adjustment coupling 53 is threadably coupled to an end of the lower pin 52.

The adjustment coupling 53 is rotatably coupled to an end of a pivot arm 54. An opposing end of the pivot arm 54 is rotatably coupled to an end 32a of the push rod 32. The pivot arm 54 is pivotally coupled to the frame member 14 by a shaft 56. The adjustment coupling 53 facilitates adjustment of the gap that exists between the upper and lower contacts 20, 26 when the lower contact 26 is in the open position.

The upper coil 44 is fixedly coupled to the core 40, between the upper and intermediate legs 40a, 40c. The upper coil 44 surrounds an upper portion of the armature 42. The lower coil 46 is fixedly coupled to the core 40, between the lower and intermediate legs 40b, 40c. The lower coil 46 surrounds a lower portion of the armature 42. The upper and lower coils 44, 46 are each electrically coupled to the electronic control system 15. The permanent magnet 48 is fixed to ends of the intermediate legs 40c as depicted in FIG. 3, and are thus positioned between the intermediate legs 40c and the armature 42.

The contact mechanism 16 and the magnetic actuator 38 cooperate to open and close the upper and lower contacts 20, 26 in response to a signal from the electronic control system 15. More particularly, the electronic control system 15 is adapted to selectively energize the upper and lower coils 44, 46. Energizing the lower coil 46 causes the end portion 26a of the lower contact 26 to abut (contact) the end portion 20a of the upper contact 20, thereby closing the contacts 20, 26 and permitting electrical current to flow between the upper and lower primary terminals 22, 28. Energizing the upper coil 44 causes the end portion 26a of the lower contact 26 to move away from the end portion 20a of the upper contact 20, thereby interrupting the flow of electrical current between the upper and lower primary terminals 22, 28. Specific details concerning this feature are as follows.

The force needed to open and close the contacts 20, 26 is provided primarily by the magnetic actuator 38. In particular, closure of the contacts 20, 26 is effectuated by energizing the lower coil 46. The energized coil 46, in conjunction with the permanent magnet 48, generates a magnetic flux. The magnetic flux is conducted by the core 40, and generates a magnetic potential across the core 40 that drives the armature 42 downward, i.e., in the "-y" direction.

Downward movement of the armature 42 causes a corresponding downward movement in the lower pin 52. The downward movement of the lower pin 52 causes the pivot arm 54 to rotate in a clockwise direction about the shaft 56 (from the perspective of FIG. 3). The clockwise rotation of the pivot arm 54 imparts an upward movement to the push rod 32. Upward movement of the push rod 32 drives the lower contact 26 into contact with the upper contact 20, thereby establishing electrical contact between the upper and lower primary terminals 22, 28.

The contacts 20, 26 are opened by energizing the upper coil 44. The energized coil 44 and the permanent magnet 48 generate a magnetic flux across the core 40 that drives the armature 42 upward. The upward movement of the armature 42 causes a corresponding upward movement in the lower pin 52 which, in turn, causes the pivot arm 54 to rotate in a counterclockwise direction about the shaft 56. The counterclockwise rotation of the pivot arm 54 imparts a downward movement to the push rod 32 and the lower contact 26, thereby interrupting electrical contact between the upper and lower primary terminals 22, 28 (the contacts 20, 26 are depicted in the open position in FIG. 3).

Figure 1:
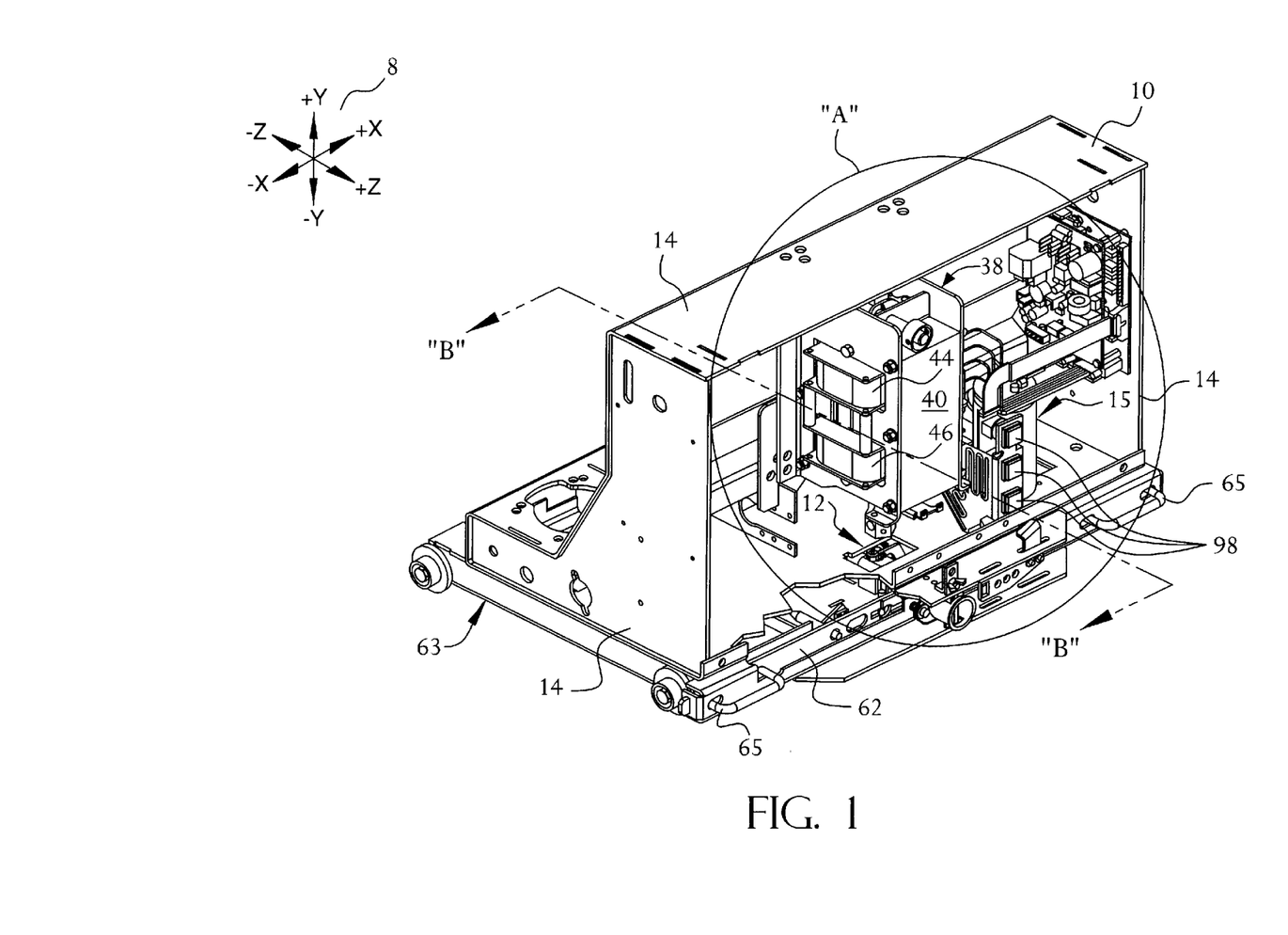
FIG. 1 is a top, front perspective view of a presently-preferred circuit breaker having a mechanical interlock.

The electronic control system 15 is adapted to energize the upper or lower coils 44, 46 in response to user input commanding the closing or opening of the contacts 20, 26 (such input may be generated by, for example, a pushbutton control panel 98 mounted on the circuit breaker 10, as shown in FIG. 1). The electronic control system 15 is also adapted to deenergize the lower coil 46 and energize the upper coil 44 when the electronic control system 15 recognizes that movement of the lower contact 26 toward the closed position is being blocked by the mechanical interlock 12. This feature is explained in detail below.

The circuit breaker 10 further comprises a racking mechanism 61. The racking mechanism 61 is adapted to move the frame member 14, the contact mechanism 16, the magnetic actuator 38, and the electronic control system 15 within the switchgear enclosure. More particularly, the racking mechanism 61 is adapted to move (or "rack") the noted components between a connect position, a test position, and a disconnect position.

The primary terminals 22, 28 engage the stabs of the switchgear enclosure when the circuit breaker is in the connect position, thereby permitting current to flow through the contacts 20, 26 if the contacts 20, 26 are in the closed position. The primary terminals 22, 28 do not engage the stabs when the circuit breaker is configured in the test and disconnect positions, thus preventing the flow of current through the contacts 20, 26 regardless of the position thereof.

The racking mechanism 61 comprises a channel member 62. A rotatable coupling 78 is mounted on the channel member 62 (see FIG. 4). The racking mechanism 61 also includes a lead screw 76 coupled to the channel member 62 via the coupling 78. The coupling 78 restrains the lead screw 76 linearly, i.e., in the "x," "y," and "z" directions, while permitting the lead screw 76 to rotate in relation to the channel member 62. The coupling 78 is adapted to mate with a rotary tool such as an electric drill, a socket wrench, or an impact wrench, thus facilitating rotation of the lead screw 76 using the rotary tool. The lead screw 76 has a first through hole 78a, a second through hole 78b, and a third through hole 78c defined therein at predetermined locations (see FIGS. 2 and 5B). The significance of the through holes 78a, 78b, 78c is discussed below.

The racking mechanism 61 also comprises a racking latch 65. The racking latch 65 is movable between a first, or "locked" position and a second, or "unlocked" position. The racking latch 65 securely engages the support truck 63 and the channel member 62 when the racking latch 65 is in the locked position, thereby locking the frame member 14 (and the contact mechanism 16) in place in relation to the channel member 62. In other words, the circuit breaker 10 cannot be racked when the racking latch 65 is in the locked position. The racking latch 65 releases the support truck 63 when the racking latch 65 is in the unlocked position, thereby permitting relative movement between the frame member 14 and the channel member 62, i.e., thereby permitting racking of the circuit breaker 10.

Figure 2:
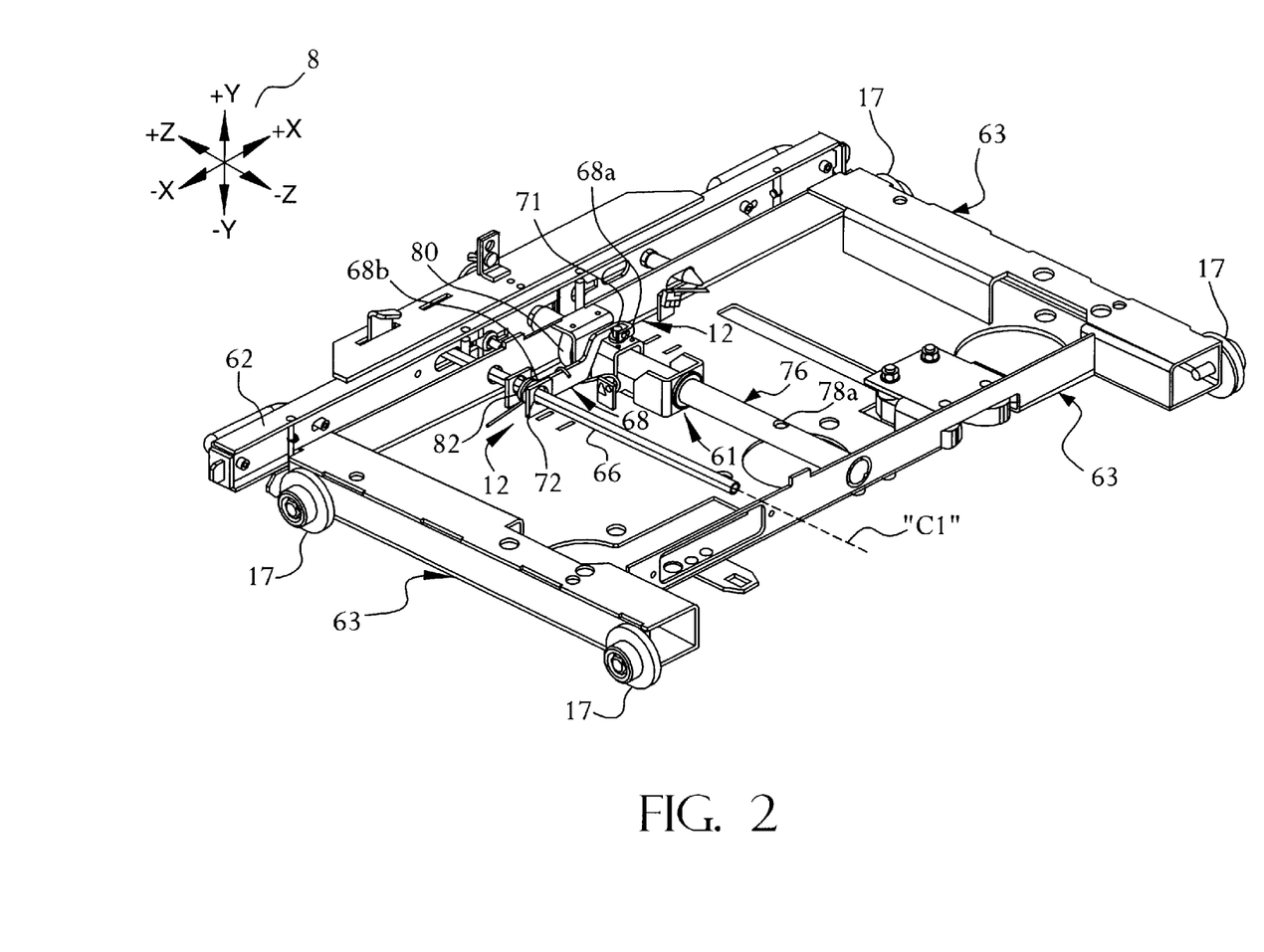
FIG. 2 is a top, rear perspective view of the a racking mechanism, a support truck, and the mechanical interlock of the circuit breaker shown in FIG. 1.
Figure 4:
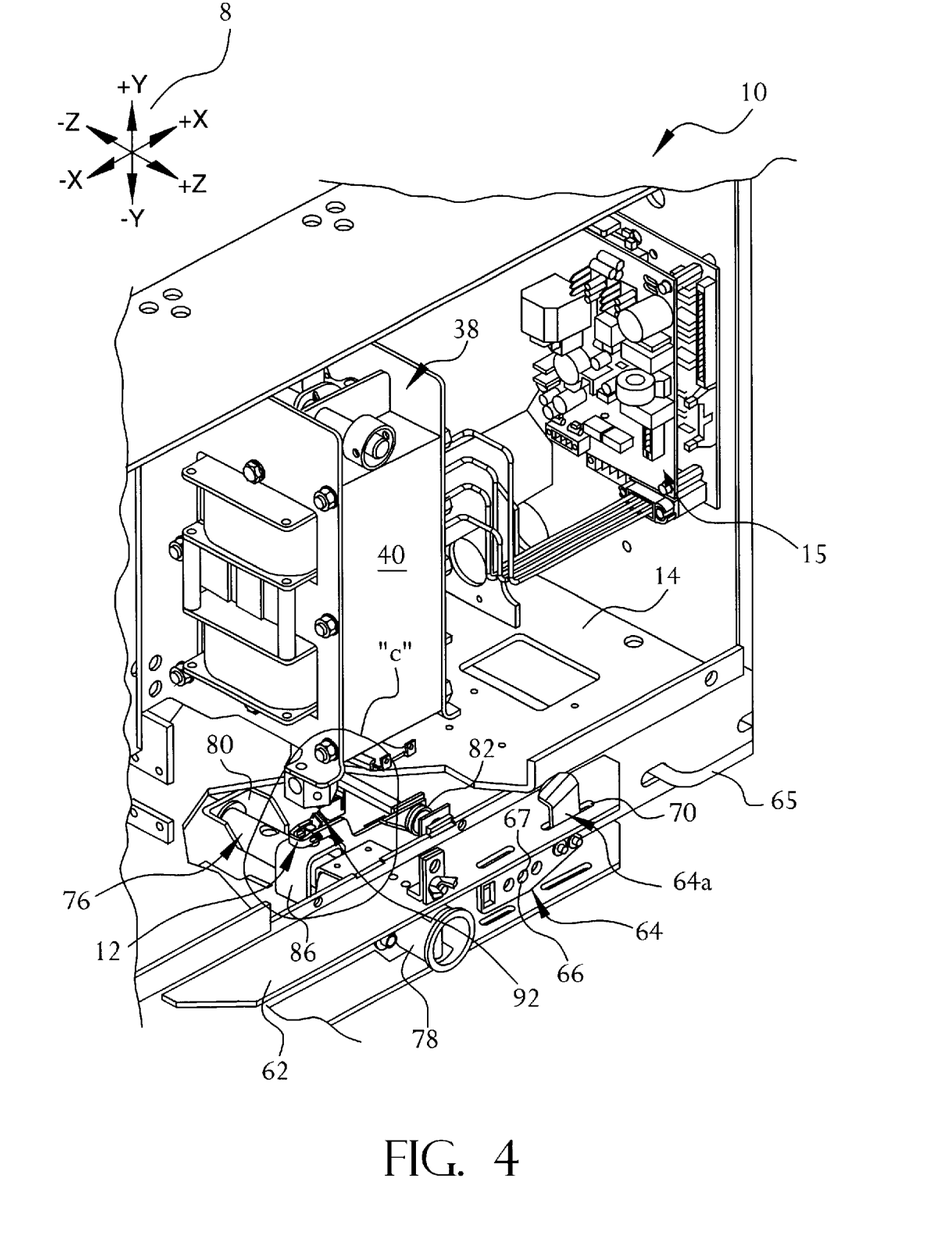
FIG. 4 is a magnified view of the area designated "A" in FIG. 1.
Figure 5A:
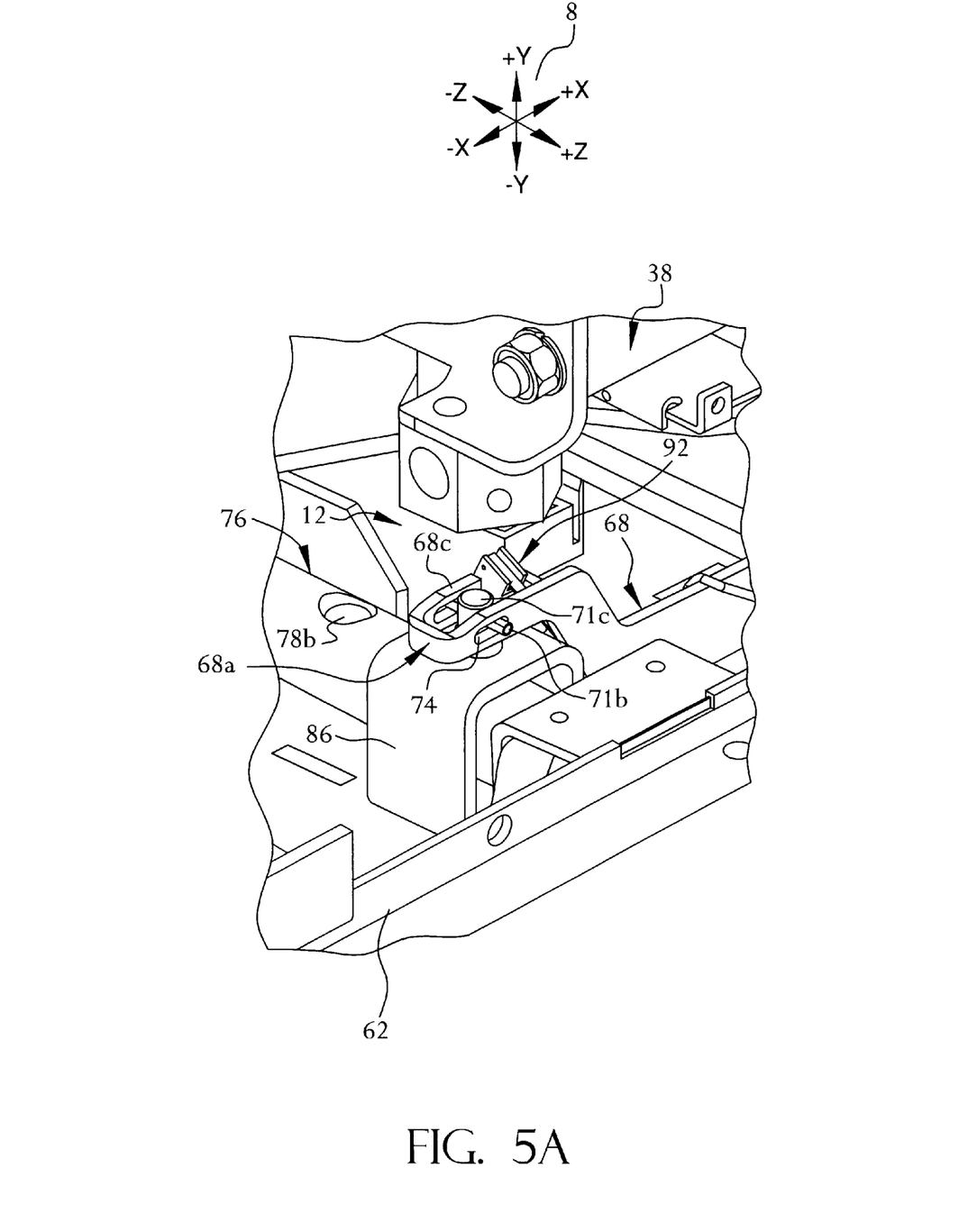
FIG. 5A is a magnified view of the area designated "C" in FIG. 4, depicting a blocking pin of the mechanical interlock shown in FIG. 2 in a lower or locked position.
Figure 5B:
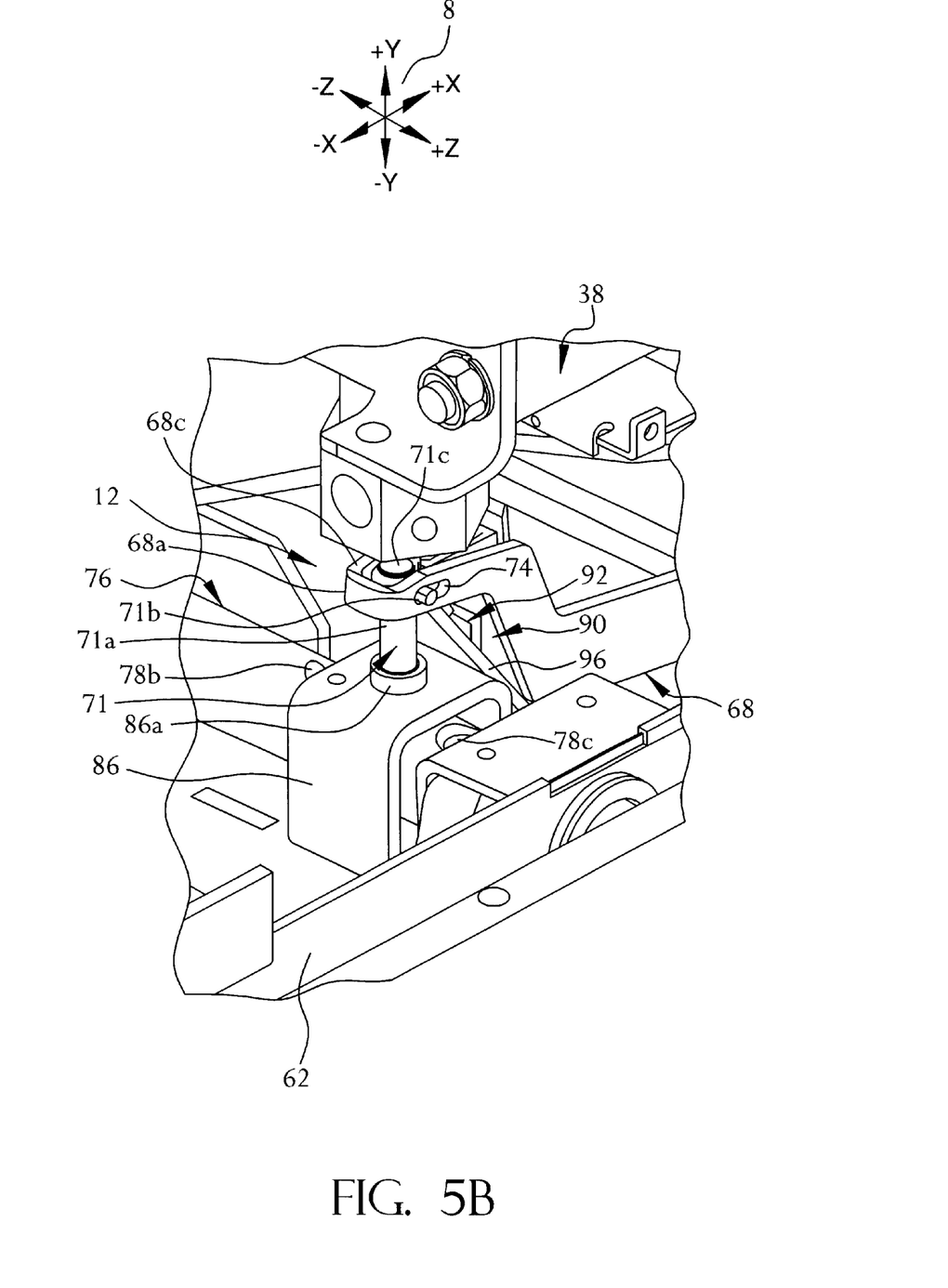
FIG. 5B is a magnified view of the area designated "C" in FIG. 4, depicting the blocking pin shown in FIG. 5A in an upper or unlocked position.
Figure 6:
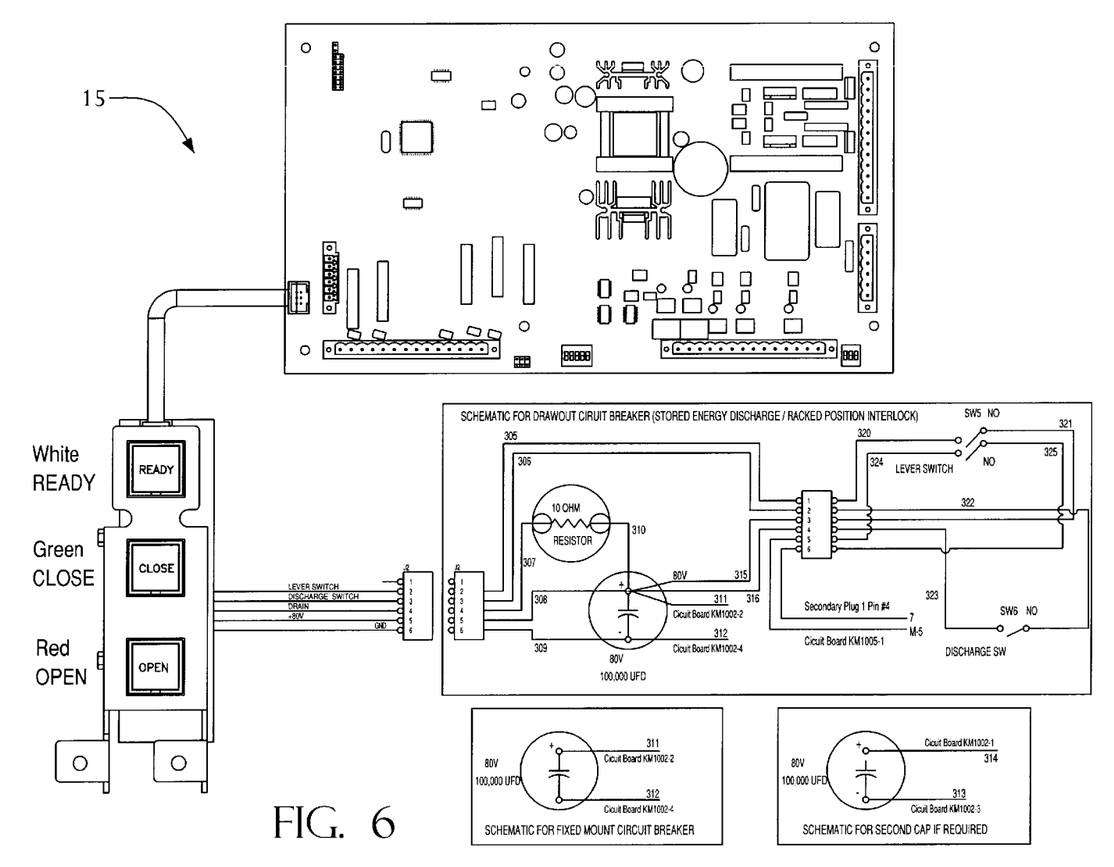
FIG. 6 is a schematic illustration of an electronic control system of the circuit breaker shown in FIGS. 1–5.
Figure 7:
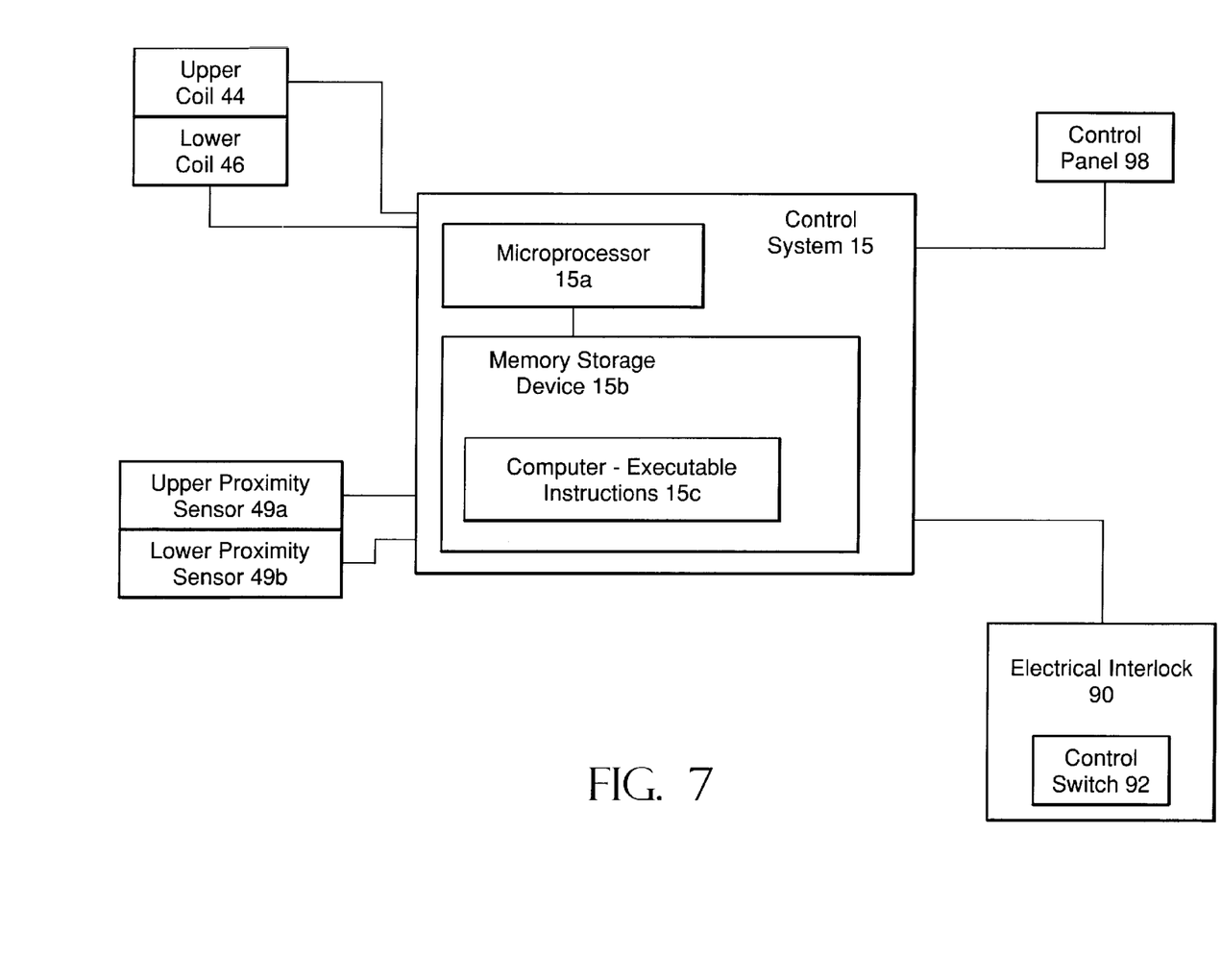
FIG. 7 is a block diagram of the electronic control system depicted in FIG. 6.

The mechanical interlock 12 also includes a screw block 80 (see FIGS. 2 and 4). The screw block 80 is fixedly coupled to the support truck 63, and is rotatably coupled to the lead screw 76. In particular, threads on the lead screw 76 engage corresponding threads on the screw block 80. The torque associated with the rotation of the lead screw 76 is transmitted to the screw block 80 via the threads, thereby imparting linear movement to the screw block 80 in the "z" direction. This movement is transmitted to the support truck 63 and the frame 14, which slides in the "z" on the support truck 63. The translation of the frame member 14 causes a corresponding movement of the contact mechanism 16 toward or away from the stabs of the switchgear enclosure. (The threads on the lead screw 76 and the screw block 80 are not depicted in the figures, for clarity.)

The circuit breaker 10 comprises a mechanical interlock 12, as noted above. The circuit breaker 10 also comprises an electrical interlock 90. The mechanical interlock 12 and the electrical interlock 90 each prevent the contacts 20, 26 from closing when the circuit breaker 10 is not positioned in either the connect, test, or disconnect positions. The mechanical interlock 12 and the electrical interlock 90 thereby substantially reduce or eliminate the potential for personal injury or equipment damage caused by unintentional or inadvertent closure of the contacts 20, 26.

Details of the mechanical interlock 12 are as follows. The interlock 12 comprises a release lever 64, a cross-shaft 66, a pivot arm 68, and a blocking pin 71. The blocking pin 71, as explained in detail below, is adapted to physically block the closure of the upper and lower contacts 20, 26 when the blocking pin 71 is selectively placed in a predetermined position.

An end of the release lever 64 is bent as depicted in FIGS. 1 and 4, thereby forming a tab portion 64a on the release lever 64. The tab portion 64a extends upwardly through a slot 70 defined in the channel member 62. The release lever 64 has a through hole 67 defined therein. The through hole 67 is adapted to receive the cross-shaft 66. More particularly, the through hole 67 is hexagonal, and the cross-shaft 66 has a hexagonal cross-section that substantially matches the shape of the through hole 67. Hence, the cross-shaft 66 rotatably engages the release lever 64 via the through hole 67, and is capable of translating in the "z" direction in relation to the release lever 64 by sliding through the through hole 67.

The cross-shaft 66 extends substantially in the "z" direction. More particularly, the cross-shaft 66 extends from the channel member 62. The cross-shaft 66 is rotatably coupled to the channel member 62 by respective fittings secured within through holes in the channel member 62. These fittings restrain the cross-shaft 66 axially, while permitting the cross-shaft 66 to rotate about its central axis in relation to the channel member 62. (The central axis of the cross-shaft 66 is denoted by the symbol "C1" in FIG. 2.) Hence, the release lever 64 and the cross-shaft 66 rotate about the central axis "C1" in response to upward or downward movement of the tab portion 64a.

The pivot arm 68 includes a first end portion 68a and a second end portion 68b (see FIG. 2). The first end portion 68a is substantially U-shaped, and has an upper surface 68c (see FIG. 5A, 5B). Slots 74 are defined in opposing sides of the first end portion 68. The second end portion 68b has a through hole 72 defined therein. The through hole 72 is adapted to receive the cross-shaft 66, i.e., the through hole 72 has a hexagonal shape that substantially matches the cross section of the cross shaft 66. Rotation of the cross-shaft 66 thus imparts a corresponding rotation to the pivot arm 68 about the central axis "C1" of the cross-shaft 66. (It should be noted that relative movement between the pivot arm 68 and the cross-member 66 in the "z" direction is facilitated by the ability of the cross-member 66 to slide through the through hole 72.)

Rotation of the pivot arm 68 causes the end portion 68a to translate upwardly and downwardly. A rotary spring 82 is coupled to the cross-shaft 66 and the pivot arm 68 (see FIGS. 2 and 4). The spring 82 biases the pivot arm 68 in a counterclockwise direction (from the perspective of FIG. 4).

The blocking pin 71 comprises a rigid body portion 71a. The blocking pin 71 also includes a roll pin 71b extending from the body portion 71a in substantially opposite directions. The slots 74 in the end portion 68a of the pivot arm 68 are adapted to receive the roll pin 71b. The pivot arm 68 thus supports the blocking pin 71, while permitting the blocking pin 71 to rotate in relation to the end portion 68a. The slots 74 also facilitate a limited amount of linear movement between the blocking pin 71 and the end portion 68a. Coupling the blocking pin 71 to the pivot arm 68 in this manner causes the blocking pin 71 to translate upwardly and downwardly with the end portion 68a. Hence, upward movement of the tab portion 64a of the release lever 64 causes a corresponding downward movement of the blocking pin 71, and downward movement of the tab portion 64a causes a corresponding upward movement of the blocking pin 71.

The blocking pin 71 and the end portion 68a of the pivot arm 68 are positioned below the magnetic actuator 38. In addition, the blocking pin 71 is positioned directly below the adjustment collar 53, i.e., the blocking pin 71 and the adjustment collar 53 are substantially aligned in the vertical ("y") direction. The blocking pin 71 and the pivot arm 68 translate in the "z" direction with the magnetic actuator 38 as the circuit breaker 10 is racked between the connect, test, and disconnect positions. More specifically, the body portion 71a of the blocking pin 71 is slidably coupled to and restrained by a U-shaped collar 86. The collar 86 is fixedly coupled to the frame member 14, and partially surrounds the lead screw 76. The collar 86 includes a guide sleeve 86a (see FIG. 5B). The guide sleeve 86a defines a passage through the collar 86; the passage is sized to receive the body portion 71a of the blocking pin 71.

Movement of the frame member 14 in the "z" direction causes a corresponding movement of the blocking pin 71. In particular, movement of the frame member 14 in the "z" direction is transmitted to the body portion 71a of the blocking pin 71 via the guide sleeve 86a. Hence, the blocking pin 71 remains substantially aligned with the magnetic actuator 38 (and the adjustment collar 53) as the circuit breaker 10 is racked between the connect, test, and disconnect positions. It should be noted that movement of the end portion 68a of the pivot arm 68 in the "z" direction is facilitated by the above-noted ability of the end portion 68b to slide in relation to the cross-member 66.

The blocking pin 71, as noted above, is adapted to physically block closure of the upper and lower contacts 20, 26 when the blocking is selectively placed in a predetermined position. In particular, the blocking pin 71 physically blocks closure of the upper and lower contacts 20, 26 by interfering with the downward movement of the armature 42. Details concerning this feature are as follows.

The through holes 78a, 78b, 78c in the lead screw 76 are adapted to receive the blocking pin 71 when the circuit breaker 10 is placed in the connect, test, or disconnect positions. More particularly, the positions of the lead screw 76, the through holes 78a, 78b, 78c, and the frame member 14 are synchronized so that the body portion 71a of the blocking pin 71 substantially aligns with the through holes 78a, 78b, 78c when the circuit breaker 10 is placed respectively in the connect, test, or disconnect positions. The bias of the spring 82 causes the body portion 71a to drop into the respective through holes 78a, 78b, 78c when the body portion 71a and the through holes 78a, 78b, 78c are so aligned, thereby placing the blocking pin in a lower (or "unlocked") position. Hence, the spacing (clearance) between an upper surface 71c of the blocking pin 71 and a lower surface 53a of the adjustment collar 53 is greatest when the circuit breaker 10 resides in the connect, test, or disconnect positions. The significance of this feature is explained below.

The blocking pin 71 prevents the lead screw 76 from rotating when the blocking pin 71 is positioned within the through holes 78a, 78b, 78c. Thus, the blocking pin must be removed from the through holes 78a, 78b, 78c before the circuit breaker 10 can be racked between the connect, test, or disconnect positions. Removal of the blocking pin 71 is accomplished by raising the blocking pin 71 away from the through holes 78a, 78b, 78c, into an upper (or "locked") position. The blocking pin 71 is raised, as noted previously, by depressing the tab portion 64a on the release lever 64.

The magnetic actuator 38 and the mechanical interlock 12 are positioned so that the blocking pin 71 can only assume its upper or locked position when the contacts 20, 26 are open. More particularly, the spacing (clearance) between the bottom surface 53a of the adjustment collar 53 and the upper surface 71c of the blocking pin 71 is insufficient to permit substantial downward translation of the armature 42 when the blocking pin 71 is in its upper position. In other words, the upper surface 71c of the blocking pin 71 interferes with and blocks any substantial downward movement of the adjustment collar 53 (and the interconnected armature 42) when the blocking pin 71 is in its upper position.

It should be noted that the upper surface 68c of the pivot arm 68 is positioned at approximately the same elevation, i.e., y-axis location, as the upper surface 71c of the blocking pin 71 when the blocking pin 71 is in its upper position. Hence, the upper surface 68c of the pivot arm 68 also interferes with the downward movement of the adjustment collar 53 and the armature 42 when the blocking pin 71 is in its upper position.

The spacing between the bottom surface 53a of the adjustment collar 53 and the upper surface 71c of the blocking pin 71 is preferably minimal when the blocking pin 71 is in its upper position. For example, the noted spacing in the exemplary circuit breaker 10 is no greater than approximately 4.5 mm. Minimal spacing is desirable to minimize the impact loading on the blocking pin 71, the pivot arm 68, the armature 42, the lower pin 52, and the adjustment collar 53 when the blocking pin 71 initially contacts the adjustment collar 53.

The noted interference between the blocking pin 71, the pivot arm 68, and the armature 42 prevents the contacts 20, 26 from closing when the blocking pin 71 is in its upper position. More particularly, blocking the downward movement of the armature 42 prevents the pivot arm 54 from rotating substantially through its range of travel, thus preventing substantial upward movement of the push rod 32 and the lower contact 26. Preventing substantial upward movement of the lower contact 26, in turn, prevents contact between the upper and lower contacts 20, 26 and thereby prevents energization of the electrical circuit.

The blocking pin 71 must be in its upper position while the circuit breaker 10 is racked between the connect, test, or disconnect positions, as noted previously. Hence, the circuit breaker 10 can only be racked into or out of the connect position when the contacts 20, 26 are open. The mechanical interlock 12 thus prevents energization or deenergization of the electrical circuit caused by racking the circuit breaker 10 into or out of the connect position when the contacts 20, 26 are closed. This feature substantially lessens or eliminates the possibility of personnel injury or equipment damage than can occur under such circumstances.

The blocking pin 71 also functions as a means for "locking out" the circuit breaker 10, i.e., for substantially reducing or eliminating any possibility that the contacts 20, 26 may close and thereby energize the electrical circuit. The circuit breaker 10 can be locked out by moving the blocking pin 71 to its upper position (by depressing the tab portion 64a of the release lever), and rotating the lead screw 76 via the couplings 78 so that the blocking pin 71 is positioned between or adjacent the through holes 78a, 78b, 78c (approximately one-quarter of a turn in the lead screw 76a is needed in the exemplary embodiment to move the blocking pin 71 a sufficient distance to lock out the circuit breaker 10). Positioning the blocking pin 71 in this manner causes a bottom surface 71e of the blocking pin 71 to reside (rest) on the lead screw 76 when the tab portion 64a is released.

The upper surfaces 71c, 68c of the blocking pin 71 and the pivot arm 68 interfere with and block any substantial downward movement of the armature 42 when the blocking pin 71 is in its upper position, as noted previously. In particular, inadvertent or otherwise unintentional actuation of the armature 42 when the blocking pin 71 is not aligned with one of the through holes 78a, 78b, 78c jams the blocking pin 71 between the armature 42 and the lead screw 76, thus blocking substantial downward movement of the armature 42 and preventing closure of the contacts 20, 26. The mechanical interlock 12 thereby eliminates or substantially reduces the possibility of inadvertent or otherwise unintentional energization of the electrical circuit.

The electronic control system 15 is adapted to recognize a condition in which the downward movement of the armature 42 is being blocked by the blocking pin 71. In particular, the electronic control system 15 monitors the position of the armature 42 via an upper and a lower proximity sensor 49a, 49b. The upper and lower proximity sensors 49a, 49b are mechanically coupled to the magnetic actuator 38 and electrically coupled to the electronic control system 15 (see FIGS. 3 and 7).

The electronic control system 15 also monitors the amount of time that elapses after the lower coil 46 is energized. The electronic control system 15 de-energizes the lower coil 46 and energizes the upper coil 44 if the armature 42 does not reach its lower position (as indicated by the lower proximity sensor 49b) within a predetermined amount of time after the lower coil 46 is energized. The electronic control system 15 thus recognizes a condition in which the downward movement of the armature 42 is being blocked by the mechanical interlock 12. The electronic control system 15 responds to this condition by stopping the magnetic actuator 38 from further attempting to move the armature 42 downward, against the blocking pin 71. This feature substantially reduces the possibility of damage to the armature 42, the blocking pin 71, the lower pin 52, and the adjustment collar 53 caused by continued or repeated contact between the adjustment collar 53 and the blocking pin 71.

The circuit breaker 10 preferably includes an electrical interlock 90 in addition to the mechanical interlock 12. The electrical interlock 90 comprises a contact switch 92 coupled to the frame member 14 (see FIGS. 5A, 5B). The switch 92 is mechanically coupled to the racking latch 65 by a linkage 96, and is electrically coupled to the electronic control system 15. The switch 92 is movable between a closed and an open position. The electronic control system 15 is adapted to prevent the lower coil 46 from being energized when the switch 92 is open. In particular, opening the switch 92 interrupts the control signal that commands energization of the lower coil 46. Hence, the lower coil 46 can only be energized when the switch 92 is in the closed position.

The linkage 96 is adapted to move the switch 92 between the closed and open positions. More particularly, the linkage 96 moves the switch 92 to the open position when the racking latch 65 is placed in the unlocked position. The linkage 96 moves the switch 92 to the closed position when the racking latch 65 is placed in the locked position. Hence, the electrical interlock 90 prevents the lower coil 46 from being energized when the racking latch 65 is in the unlocked position. The contacts 20, 26 can only be closed, and the electrical circuit can only be energized, when the circuit breaker 10 is in the connect, test, or disconnect positions. The electrical interlock 90 thus prevents energization or deenergization of the electrical circuit caused by racking the circuit breaker 10 into or out of the connect position when the contacts 20, 26 are closed. This feature thus substantially lessens or eliminates the possibility of personnel injury or equipment damage than can occur under such circumstances.

The circuit breaker 10 and the electrical interlock 90 function independently. In particular, the mechanical interlock 12 prevents inadvertent or otherwise unintentional energization of the electrical circuit when the electrical interlock 90 fails to do so. The mechanical interlock 12 is thus redundant with respect to the electrical interlock 90.

The mechanical interlock 12 operates without the use of electrical switches or other electrical components, as indicated by the above discussion. The mechanical interlock 12 therefore functions as an entirely mechanical interlock. The mechanical interlock 12 can thus be used in applications where a redundant mechanical interlock is preferred or required in accordance with a regulatory standard such as ANSI C37.20.2.

The mechanical interlock 12 has a minimal parts count, and the kinematic relationships between the various components thereof are relatively simple. Hence, the mechanical interlock 12 offers potential advantages relating to cost, simplicity, compactness, and reliability.

The mechanical interlock 12 is completely self-contained, i.e., the blocking pin 71 can be moved between its upper and lower positions without a need to install or remove any hardware. Furthermore, the design of the mechanical interlock 12 permits the upper surfaces 71c, 68c of the of the blocking pin 71 and the pivot arm 68 to be placed in close proximity to the bottom surface 53a of the adjustment collar 53. This feature minimizes the potential for damage to the adjustment collar 53, the armature 42, the blocking pin 71, the lower pin 52, or the pivot arm 68 caused by contact between the locking pin 71 and the adjustment collar 53.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention.

What is claimed is:

1. A circuit breaker, comprising:
   a frame member;
   a contact mechanism fixedly coupled to the frame member for establishing electrical contact with an electrical circuit, comprising a first contact member and a second contact member being movable in relation to the first contact member;
   an actuator mechanism fixedly coupled to the frame member, comprising an armature mechanically coupled to the second contact member and urging the second contact member into electrical contact with the first contact member on a selective basis;
   a racking mechanism comprising a channel member and a lead screw rotatably coupled to the channel member and the frame member, the frame member being movable between at least two predetermined positions in relation to the channel member in response to rotation of the lead screw; and
   a mechanical interlock coupled to the frame member and comprising a blocking pin positioned between the lead screw and the armature when the frame member is located between the at least two predetermined positions, wherein the blocking pin inhibits movement of the armature when the blocking pin is positioned between the lead screw and the armature thereby preventing the armature from urging the second contact member into electrical contact with the first contact member.

2. The circuit breaker of claim 1, wherein the lead screw has at least a first and a second through hole formed therein, the first and the second through holes substantially align with and receive the blocking pin when the frame member is positioned respectively in the first and second positions thereby permitting the armature to urge the second contact member into electrical contact with the first contact member.

3. The circuit breaker of claim 2, wherein the frame member is movable between a connect position, a test position, and a disconnect position in response to rotation of the lead screw, the lead screw has a third through hole formed therein, and the first, second, and third through holes substantially align with and receive the blocking pin when the frame member is positioned respectively in the connect, test, and disconnect positions.

4. The circuit breaker of claim 2, wherein the blocking pin prevents the lead screw from rotating when the blocking pin is positioned in one of the first and the second through holes.

5. The circuit breaker of claim 1, wherein the mechanical interlock further comprises a release lever, a pivot arm pivotally coupled to the blocking pin, and a cross shaft rotationally coupled to cross shaft and the release lever, wherein the blocking pin is movable between an upper and a lower position in response to movement of the release lever.

6. The circuit breaker of claim 5, wherein the cross shaft is rotatably coupled to the channel member.

7. The circuit breaker of claim 5, further comprising a rotary spring coupled to the cross shaft and the pivot arm.

8. The circuit breaker of claim 5, wherein the blocking pin comprises a rigid body portion and a roll pin extending from the body portion in substantially opposite directions and the pivot arm has slots formed in an end portion thereof for receiving the roll pin.

9. The circuit breaker of claim 1, further comprising an electronic control system for energizing a first and a second coil of the actuator mechanism on a selective basis.

10. The circuit breaker of claim 9, wherein the electronic control system comprises a microprocessor, a memory-storage device electrically coupled to the microprocessor, and a set of computer-executable instructions stored on the memory-storage device, the computer-executable instructions (i) monitoring an amount of time that elapses after the second coil is energized and (ii) de-energizing the second coil if the armature does not translate between a first and a second position within a predetermined interval of time following energization of the second coil.

11. The circuit breaker of claim 10, wherein the electronic control system energizes the first coil if the armature does not translate between the first and second positions within the predetermined interval of time following energization of the second coil.

12. The circuit breaker of claim 10, further comprising (i) a first proximity switch mechanically coupled to the actuator mechanism and electrically coupled to the electronic control system, the second proximity switch providing a predetermined input to the electronic control system when the armature is in the first position, and (ii) a second proximity switch mechanically coupled to the actuator mechanism and electrically coupled to the electronic control system, the second proximity switch providing a predetermined input to the electronic control system when the armature is in the second position.

13. The circuit breaker of claim 9, further comprising an electrical interlock comprising a contact switch fixedly coupled to the frame member and electrically coupled to the electronic control system, wherein the contact switch is movable between an open and a closed position and the computer-executable instructions prevent energization of at least one of the first and second coils when the contact switch is in the open position.

14. The circuit breaker of claim 13, further comprising a support truck, wherein the frame member is positioned on the support truck, the racking mechanism further comprises a racking latch movable between a locked position wherein the racking latch securely engages the channel member and the support truck thereby preventing movement of the frame member in relation to the channel member, and an open position wherein the frame member is movable in relation to the channel member, and the contact switch is mechanically coupled to the racking latch by a linkage that closes the contact switch when the racking latch is in the locked position and open the contact switch when the racking latch is in the unlocked position.

15. The circuit breaker of claim 1, wherein the armature is coupled to the second contact member by a pivot arm.

16. The circuit breaker of claim 1, wherein the actuator is a magnetic actuator.

17. The circuit breaker of claim 16, wherein the actuator further comprises a core fixedly coupled to the frame member, a first and a second coil fixedly coupled to the core, and a permanent magnet fixedly coupled to the core.

18. The circuit breaker of claim 1, wherein the contact mechanism further comprises:
- a casing fixedly coupled to the frame member,
- a vacuum interrupter positioned within the casing and having an end portion of the first contact member and an end portion of the second contact member positioned therein;
- an upper primary terminal for establishing electrical contact with the electrical circuit, the upper primary terminal being fixedly coupled to an upper portion of the casing and electrically coupled to the first contact member; and
- a lower primary terminal for establishing electrical contact with the electrical circuit, the lower primary terminal being fixedly coupled to a lower portion of the casing, electrically coupled to the second contact member.

19. The circuit breaker of claim 14, wherein the racking mechanism further comprises a screw block fixedly coupled to the support truck and rotatably coupled to the lead screw.

20. The circuit breaker of claim 1, further comprising a support truck, wherein the frame member is movably disposed on the support truck.

21. The circuit breaker of claim 20, wherein the channel member is rotatably coupled to the support truck.

22. The circuit breaker of claim 1, wherein the mechanical interlock further comprises a collar fixedly coupled to the support truck and slidably coupled to the blocking pin.

23. The circuit breaker of claim 1, further comprising an adjustment collar mechanically coupled to the armature, wherein the blocking pin interferedly contacts the adjustment collar when the blocking pin is positioned between the lead screw and the armature thereby preventing the armature from urging the second contact member into electrical contact with the first contact member.

24. The circuit breaker of claim 23, further comprising a second pin mechanically coupled to the adjustment collar and the armature.

25. A circuit breaker, comprising:
- a contact mechanism for establishing electrical contact with an electrical circuit, comprising a first contact member and a second contact member being movable in relation to the first contact member;
- an actuator mechanism comprising an armature mechanically coupled to the second contact member, the armature being selectively positionable between a closed position in which the armature urges the second contact member into electrical contact with the first contact member thereby permitting energization of the electrical circuit, and an open position in which the armature urges the second contact member away from the first contact member thereby inhibiting energization of the electrical circuit; and
- a mechanical interlock comprising a blocking pin selectively positionable between a first position proximate the armature and a second position distal the armature, wherein the blocking pin interrupts movement of the armature from the open to the closed positions when the blocking pin is in the first position.

26. The circuit breaker of claim 25, further comprising an adjustment collar mechanically coupled to the armature, wherein the blocking pin interferedly contacts the adjustment collar when the blocking pin is in the first position thereby interrupting movement of the armature from the open to the closed positions.

27. The circuit breaker of claim 26, further comprising a second pin mechanically coupled to the adjustment collar and the armature.

28. A circuit breaker, comprising:
- a frame member movable between a connect position, a test position, and a disconnect position;
- a contact mechanism fixedly coupled to the frame member for establishing electrical contact with an electrical circuit, comprising a first contact member and a second contact member movable in relation to the first contact member;
- an actuator mechanism fixedly coupled to the frame member, comprising an armature mechanically coupled to the second contact member and urging the second contact member into electrical contact with the first contact member on a selective basis;
- a racking mechanism comprising a channel member and a lead screw rotatably coupled to the channel member and the frame member and having a first, a second, and a third through hole formed therein, the frame member being movable between the connect, test, and disconnect positions in response to rotation of the lead screw; and
- a mechanical interlock coupled to the frame member and comprising a blocking pin and a pivot arm pivotally coupled to the blocking pin and moving the blocking pin between a first position in which at least a portion of the blocking pin is located within one of the first, second, and third through holes, and a second position, wherein the blocking pin substantially aligns with the first, second, and third through holes when the frame member is located respectively in the connect, test, and disconnect positions, and the blocking pin interferes with movement of the armature when the blocking pin is located in the second position thereby preventing the armature from urging the second contact member into electrical contact with the first contact member.

29. The circuit breaker of claim 28, further comprising an electronic control system for energizing a first and a second coil of the actuator mechanism on a selective basis.

30. The circuit breaker of claim 29, wherein the electronic control system comprises a microprocessor, a memory-storage device electrically coupled to the microprocessor, and a set of computer-executable instructions stored on the memory-storage device, the computer-executable instructions (i) monitoring an amount of time that elapses after the second coil is energized and (ii) de-energizing the second coil if the armature does not translate between a first and a second position within a predetermined interval of time following energization of the second coil.

31. The circuit breaker of claim 30, wherein the electronic control system energizes the first coil if the armature does not translate between the first and second positions within the predetermined interval of time following energization of the second coil.

32. The circuit breaker of claim 29, further comprising an electrical interlock comprising a contact switch fixedly coupled to the frame member and electrically coupled to the electronic control system, wherein the contact switch is movable between an open and a closed position and the computer-executable instructions prevent energization of at least one of the first and second coils when the contact switch is in the open position.

33. The circuit breaker of claim 28, further comprising an adjustment collar mechanically coupled to the armature, wherein the blocking pin interferedly contacts the adjustment collar when the blocking pin is located in the second position thereby preventing the armature from urging the second contact member into electrical contact with the first contact member.

34. The circuit breaker of claim 33, further comprising a second pin mechanically coupled to the adjustment collar and the armature.

* * * * *

UNITED STATES PATENT AND TRADEMARK OFFICE
CERTIFICATE OF CORRECTION

PATENT NO. : 6,545,234 B1
DATED : April 8, 2003
INVENTOR(S) : Marty L. Trivette and Murray K. Jones

It is certified that error appears in the above-identified patent and that said Letters Patent is hereby corrected as shown below:

<u>Title page,</u>
Item [73], should read:

-- Assignee: ABB Technology AG, Zurich (CH) --

Signed and Sealed this

Fifth Day of August, 2003

JAMES E. ROGAN
*Director of the United States Patent and Trademark Office*